(No Model.)
J. B. BAIRD.
DEVICE FOR OPERATING THE PARTS OF SPLIT NUTS, DIES, AND SUCH LIKE ARTICLES.
No. 465,622. Patented Dec. 22, 1891.
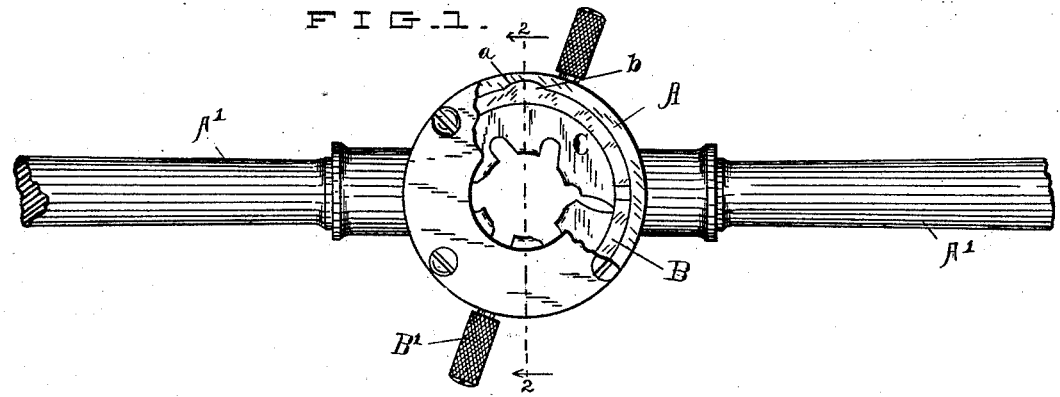
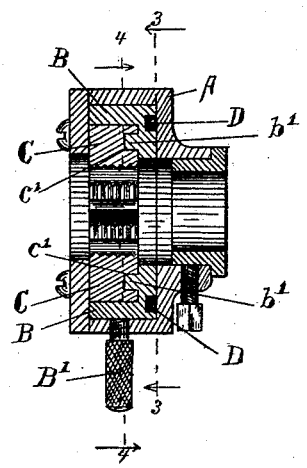
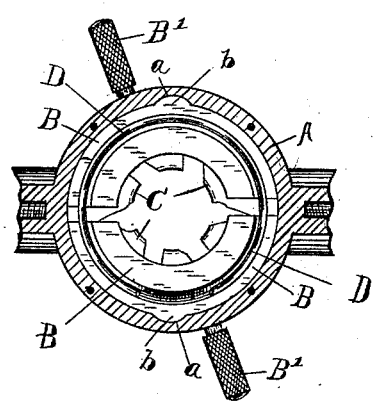
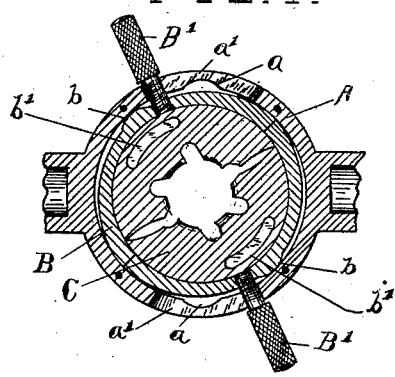
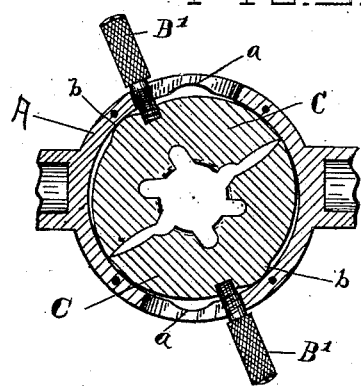
WITNESSES.
Frank W. Warner
Frank N. Wood
INVENTOR.
James B. Baird,
per C. & E. W. Bradford,
ATTORNEYS.

UNITED STATES PATENT OFFICE.

JAMES B. BAIRD, OF NOBLESVILLE, INDIANA, ASSIGNOR OF TWO-THIRDS TO JOHN HOLLORAN, OF SAME PLACE, AND MELVILLE O. HALDEMAN, OF INDIANAPOLIS, INDIANA.

DEVICE FOR OPERATING THE PARTS OF SPLIT NUTS, DIES, AND SUCH LIKE ARTICLES.

SPECIFICATION forming part of Letters Patent No. 465,622, dated December 22, 1891.

Application filed March 3, 1891. Serial No. 383,585. (No model.)

*To all whom it may concern:*

Be it known that I, JAMES B. BAIRD, a citizen of the United States, residing at Noblesville, in the county of Hamilton and State of Indiana, have invented certain new and useful Improvements in Devices for Operating the Parts of Split Nuts, Dies, and Such Like Articles, of which the following is a specification.

The object of my said invention is to provide a means whereby split nuts, dies for cutting threads on bolts, pipes, &c., and other similar devices may be instantly released from the thread on which they run and expanded so as to be withdrawn from the pipe, bolt, rod, or other article, thus saving the time usually consumed in turning or "backing" such devices off. This object is accomplished by mounting the split nut or die in a surrounding casing, circular in general outline, the interior surface of which has cam depressions, and providing, either upon the halves of the nut or die or upon an interposed casing carrying the same, corresponding cam projections, which, when they rest in said recesses, permit the halves of the nut to expand or separate, but which, when forced around in contact with another portion of the interior surface of said surrounding casing, force the halves of the nut or die toward each other and into operative relation.

I will now proceed to describe a bolt or pipe cutting die embodying my said invention; but I do not wish to be understood as confining myself to such a die in applying said invention, as I may use it for any mechanical purpose to which it is applicable.

Referring to the accompanying drawings, which are made a part hereof, and on which similar letters of reference indicate similar parts, Figure 1 is an elevation, with the cap-plate partly broken away and the ends of the handles broken off, of a die embodying my said invention; Fig. 2, a transverse sectional view of the same on the dotted line 2 2 in Fig. 1; Fig. 3, a sectional view showing the under side of the intermediate casing carrying the nut, in elevation, on the dotted line 3 3 in Fig. 2; Fig. 4, a central sectional view looking toward the right from the dotted line 4 4 in Fig. 2; and Fig. 5, a view similar to Fig. 4, except that the intermediate casing is omitted.

In said drawings, the portions marked A represent the surrounding casing; B, an intermediate casing which I prefer to employ; C, the die or nut, and D a spring by which said casing is forced outwardly.

The casing A is similar to that which contains a die or nut in any analogous structure, except that its interior surface has recesses or depressions $a$ to receive the cams on the contained casing or die. It is provided with the usual handles A' when used as a handle, as in the form shown, or with any suitable or ordinary means of attachment when the die or nut is to be used in a machine. Slots $a'$ are provided, which extend through its shell to accommodate the handles by which the contained casing or die or nut is operated.

The intermediate casing B, when used, is formed in halves and has cam projections $b$, adapted to enter the cam-recesses $a$. It is suitably formed to receive and carry the die or nut, and said casing and said die or nut are provided with a suitable projection, as $b'$, and a suitable cavity, as $c'$, which engage with each other and secure the parts in fixed relation when assembled, but which permit them to be easily separated when desired. As shown in the drawings, this casing and the die are so arranged relatively to each other that the separations between the two halves of the two structures do not register with each other. A complete circuit being thus always maintained with the four parts, a somewhat more accurate result is secured than would otherwise be the case. The form and mode of attachment of these parts relatively to each other are best shown in Figs. 2 and 3. Handles B' are secured to the halves of this casing and extend out through the slots $a'$. These handles may of course be used to turn the halves of the die or nut (or intermediate casing) in either direction; but commonly it will be only necessary to employ them to turn said halves to operative relation, as a slight reverse motion of the structure as a whole will usually operate to release said die or nut.

The die or nut C when the intermediate casing is used is or may be of an ordinary and well-known form, except that a registering cavity or projection to secure it in fixed relation to the corresponding part of said casing should be employed. When the intermediate casing is dispensed with, (which is, as shown in Fig. 5, entirely practicable,) the cams would be formed directly upon the periphery of this die or nut, and the operating-handles will also be attached directly thereto. It is highly desirable, however, to use this intermediate casing for the reason that when they are used but one of the general structures need be provided to do a large variety of work, as dies of the same exterior size, but of different cutting sizes, may be provided and made interchangeable, and the operation of changing from one size to another may be accomplished much more conveniently, as will be readily understood.

The spring D is seated in a groove in the under side of the intermediate casing B when the same is provided, or in a similar groove in the nut or die itself when the intermediate casing is not used. Its operation is to distend or hold apart the halves of the die or nut to the greatest limit permitted by the surrounding structure, while its resistance is such that it may be easily compressed and the halves of the nut forced toward each other by the provided means.

Having thus fully described my said invention, what I claim as new, and desire to secure by Letters Patent, is—

1. The combination, with the halves of a divided die, nut, or similar structure having peripheral cam projections, of a surrounding casing having corresponding interior cam depressions, substantially as and for the purposes described.

2. The combination, with the halves of a divided die, nut, or similar structure having peripheral cam projections, of a surrounding casing having cam depressions or recesses, slots in said casing, and handles extending through said slots and connected with the die or nut or part carrying the same.

3. The combination of the halves of a divided die, nut, or similar structure provided with peripheral cam projections, a surrounding casing having corresponding cam recesses or depressions, and a spring secured to said die or nut, whereby it is distended or held apart to the limit permitted by the surrounding structure, substantially as set forth.

4. The combination, with the halves of a divided die, nut, or similar structure, of a similarly-divided intermediate casing in which it is mounted, which casing is provided with peripheral cams, and a main casing having similar cam recesses or depressions containing the whole, substantially as set forth.

5. The combination of the main casing A, the intermediate divided casing B, the divided die or nut C, and the spring D, said several parts being arranged and operating substantially as set forth.

In witness whereof I have hereunto set my hand and seal, at Indianapolis, Indiana, this 27th day of February, A. D. 1891.

JAMES B. BAIRD. [L. S.]

Witnesses:
E. W. BRADFORD,
FRANK W. WOOD.